(12) United States Patent
Wolschlager et al.

(10) Patent No.: US 7,374,526 B1
(45) Date of Patent: May 20, 2008

(54) TOOL REPLENISHING APPARATUS

(75) Inventors: Roy L. Wolschlager, 1335 Kentfield Dr., Rochester, MI (US) 48307; Ali M. Saeedy, 36601 Park Place Dr., Sterling Heights, MI (US) 48310; Hussein M. Kalaoui, 2545 Coolidge Hwy., Apt. 28, Troy, MI (US) 48084; Philip S. Szuba, Algonac, MI (US); Keller J. McGaffey, Troy, MI (US); Floyd P. Crelley, Linden, MI (US)

(73) Assignees: Roy L. Wolschlager, Rochester, MI (US); Ali M. Saeedy, Rochester Hills, MI (US); Hussein M. Kalaoui, Troy, MI (US)

( * ) Notice: Subject to any disclaimer, the term of this patent is extended or adjusted under 35 U.S.C. 154(b) by 250 days.

(21) Appl. No.: 10/652,089

(22) Filed: Aug. 29, 2003

(51) Int. Cl.
*B23Q 3/157* (2006.01)
(52) U.S. Cl. .............. 483/55; 483/3; 483/54; 483/56; 483/57; 483/59
(58) Field of Classification Search .............. 483/3, 483/54–57, 59
See application file for complete search history.

(56) References Cited

U.S. PATENT DOCUMENTS

| | | | | |
|---|---|---|---|---|
| 3,292,235 A | * | 12/1966 | Riedel | 483/54 |
| 3,478,419 A | * | 11/1969 | Cupler | 483/28 |
| 3,621,546 A | * | 11/1971 | Wilmer et al. | 483/54 |
| 3,816,890 A | * | 6/1974 | Cupler, II | 29/26 A |
| 3,911,540 A | * | 10/1975 | Johnson et al. | 483/7 |
| 4,196,501 A | * | 4/1980 | Shimajiri et al. | 29/26 A |
| 4,669,174 A | * | 6/1987 | Fischer et al. | 483/1 |
| 5,300,006 A | * | 4/1994 | Tanaka et al. | 483/56 |
| 5,376,062 A | * | 12/1994 | Zeichner | 483/55 |
| 5,669,867 A | * | 9/1997 | Hoppe | 483/55 |
| 5,947,880 A | * | 9/1999 | Stagnitto et al. | 483/58 |
| 6,066,078 A | * | 5/2000 | Koelblin et al. | 483/55 |
| 6,334,840 B1 | * | 1/2002 | Asai et al. | 483/1 |
| 2003/0125175 A1 | * | 7/2003 | Seo | 483/55 |
| 2005/0143237 A1 | * | 6/2005 | Ryu | 483/54 |

* cited by examiner

*Primary Examiner*—Monica Carter
*Assistant Examiner*—Eric A. Gates
(74) *Attorney, Agent, or Firm*—Farris Law, P.C.

(57) ABSTRACT

A tool changing apparatus automatically changes tools mounted on the spindle of a transfer machine module. The apparatus includes a tool gripper magazine that releasably holds at least two tools. A guillotine supports the tool gripper magazine for motion between a raised stand-by position clear of the spindle and a lowered tool change position closer to the spindle so that the tools in the magazine can be exchanged with a tool supported on the spindle. A carriage movably supports the guillotine on a support frame for motion between a forward position adjacent the transfer line and the spindle and a rearward position displaced from the transfer line. When the carriage is in the rearward position, the guillotine can be lowered to a position where it is easily accessible to an operator so that the tools in the magazine can be replenished.

18 Claims, 11 Drawing Sheets

TOOL REPLENISHING APPARATUS

FIELD OF THE INVENTION

This invention relates generally to a mechanism for positioning a tool changing magazine so that the magazine will be in one position to change tools mounted in the spindle of a transfer machine module and in another position to replenish the tools in the magazine.

BACKGROUND OF THE INVENTION

Tool changers provide metal cutting machine tools with the ability to store and automatically select from a plurality of cutting tools. This allows a single machine tool to perform a series of different machining operations without having to manually change tools. Over time, however, the tools become dull or worn to the point where they must be sharpened or replaced.

In a stand-alone machine tool, referred to herein as a CNC machine tool, the interchangeable tools are stored in a tool magazine positioned overhead or alongside a work zone where machining takes place. It is known for such a tool magazine to be supported for reciprocal motion between a stowed tool position clear of the spindle to be serviced, and a tool change position within the reach of spindle for tool exchange. When the tools in the magazine need to be sharpened or have worn out, it is relatively easy for an operator to move around and gain access to the magazine of a stand-alone CNC machine tool to remove and replenish the tools.

In a transfer line, however, machine tools generally do not stand alone, and access is very limited. A series of machines called transfer machine modules, referred to here as TMMs, are arranged close together in a series along a dedicated transfer mechanism. The transfer mechanism transfers workpieces through an area called a work zone tunnel where the various TMMs are able to perform machining operations on them. Because the work zone tunnel must be free of obstructions, the tool changer cannot occupy this space. Accordingly, it is known to position a tool magazine above each of the TMMs. The tool magazines are positioned above the forward ends of the modules, adjacent to the spindles, and adjacent to the work zone tunnel. The close proximity of adjacent TMMs and the need to keep the work zone tunnel free of obstructions creates a problem for personnel who must carry heavy tools to and from the tool magazines for tool replenishment. In some cases, an operator must move a rolling step ladder, as close as possible to the magazine, then climb the ladder with replacement tools, and reach out two or three feet toward the work zone tunnel to remove and replace the tools. The operator then must carry the spent tools down the ladder, and in many cases roll the ladder away from the transfer line. As the tools are relatively heavy, this is not an ergonomically friendly operation. In addition, a rolling step ladder unit of sufficient stability takes up a significant amount of valuable floor space. Since it is not uncommon to have lubrication and cutting fluids on the floor in the vicinity of the TMMs, the floor is slippery, and the fluids get transferred to the steps of the ladder by the worker's shoes, making the tool replacement process even more precarious. This particular problem exists both for TMMs and CNC machine tools.

BRIEF SUMMARY OF THE INVENTION

The invention is a tool changing apparatus for cooperating with a transfer machine module to automatically change tools mounted in the machine tool spindle of the transfer machine module. The apparatus includes a tool gripper magazine configured to releasably hold a plurality of tools. A guillotine supports the tool gripper magazine for motion between a raised stand-by position clear of a machine tool spindle and a lowered tool change position in alignment with the axis of the spindle, where tools in the magazine can be exchanged with the tool held by the spindle. The guillotine is mounted in a carriage that movably supports the guillotine on a support frame for motion between a forward position adjacent the transfer line and the spindle and a rearward position displaced from the transfer line and more easily accessibly to an operator. When the guillotine is in the rearward position, the guillotine can be lowered, providing access to the tools in the magazine to an operator standing on the shop floor.

Objects, features and advantages of this invention include providing a tool changing apparatus that allows easy and ergonomically correct operator access to tools held in a tool magazine when the tools are worn and in need of replacement, that provides tool access to an operator standing on a shop floor, that provides tool access at an approximate chest level of an operator standing on a shop floor, that is capable of operating in an automatic mode at a high rate of production, that is capable of operating for an entire shift without downtime for tool change, and that is quick and highly reliable in its operation.

BRIEF DESCRIPTION OF THE SEVERAL VIEWS OF THE DRAWINGS

These and other objects, features and advantages of this invention will be apparent from the following detailed description of the preferred embodiment(s) and best mode, appended claims, and accompanying drawings in which:

FIG. 3A is a detail view showing a position lock mechanism.

DETAILED DESCRIPTION OF THE PREFERRED EMBODIMENT

Figure 1:
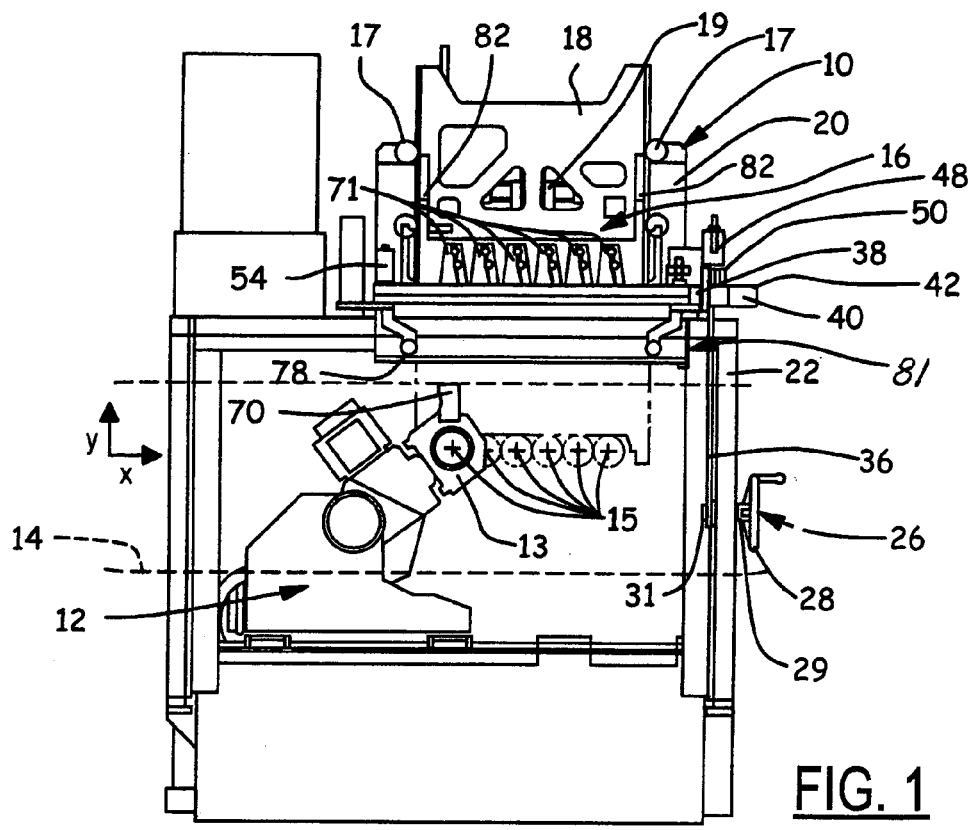
FIG. 1 is a front view of a tool changing apparatus constructed according to the invention and installed with a transfer machine module.

Turning now to the drawing figures, FIG. 1 shows a tool changing apparatus generally designated by the reference numeral 10. The tool changing apparatus 10 cooperates with a transfer machine module 12 to automatically change tools 15 mounted on a machine tool spindle 13 of the transfer machine module 12. The machine tool spindle is mounted on the transfer machine module base so that it may be driven along the X, Y, and Z axis both for machining and tool change operations. According to convention, the X axis runs in the horizontal direction, the Y axis runs in the vertical direction, and the Z axis runs in the direction of spindle feed-out. The apparatus 10 is designed to service a transfer machine module 12 that may be positioned along a transfer line abreast of and adjacent other transfer machine modules (not shown), and to perform machining operations on workpieces being transported along such a transfer line through a work zone tunnel 14. As best shown in FIGS. 3–9, the apparatus 10 includes a linear tool gripper magazine 16 or "wine rack" that releasably holds six tools 15. In other embodiments, the tool gripper magazine 16 may be designed to hold either less or more than six tools 15. As also best shown in FIGS. 3–9, the apparatus 10 includes a guillotine 18 that supports the tool gripper magazine 16 on a series of cam rollers 17 for vertical motion between a raised, stand-by position clear of the machine tool spindle 13, and a lowered, tool change position closer to the spindle 13 where tools in the magazine 16 can be exchanged with a tool 15 mounted on the spindle 13. A guillotine drive 19 is operably connected to the guillotine 18 and moves the guillotine 18 between a raised position shown in FIGS. 1–4 and 7, and a lowered position shown in FIGS. 5, 6, 8 and 9. The apparatus 10 also includes a carriage 20 that movably supports the guillotine 18 on a support frame 22 for motion between a forward position adjacent the work zone tunnel 14 and the spindle 13, and a rearward position displaced from the transfer line and more easily accessible to an operator positioned at the rear of the transfer and machine module 12.

The guillotine 18 can be moved between the raised stand-by and lowered tool change positions only when the carriage 20 is in the full forward or full rearward position. The guillotine 18 is shown at its forward position in FIGS. 2 and 6–8 and is shown at its rearward position in FIGS. 3–5.

Figure 3:
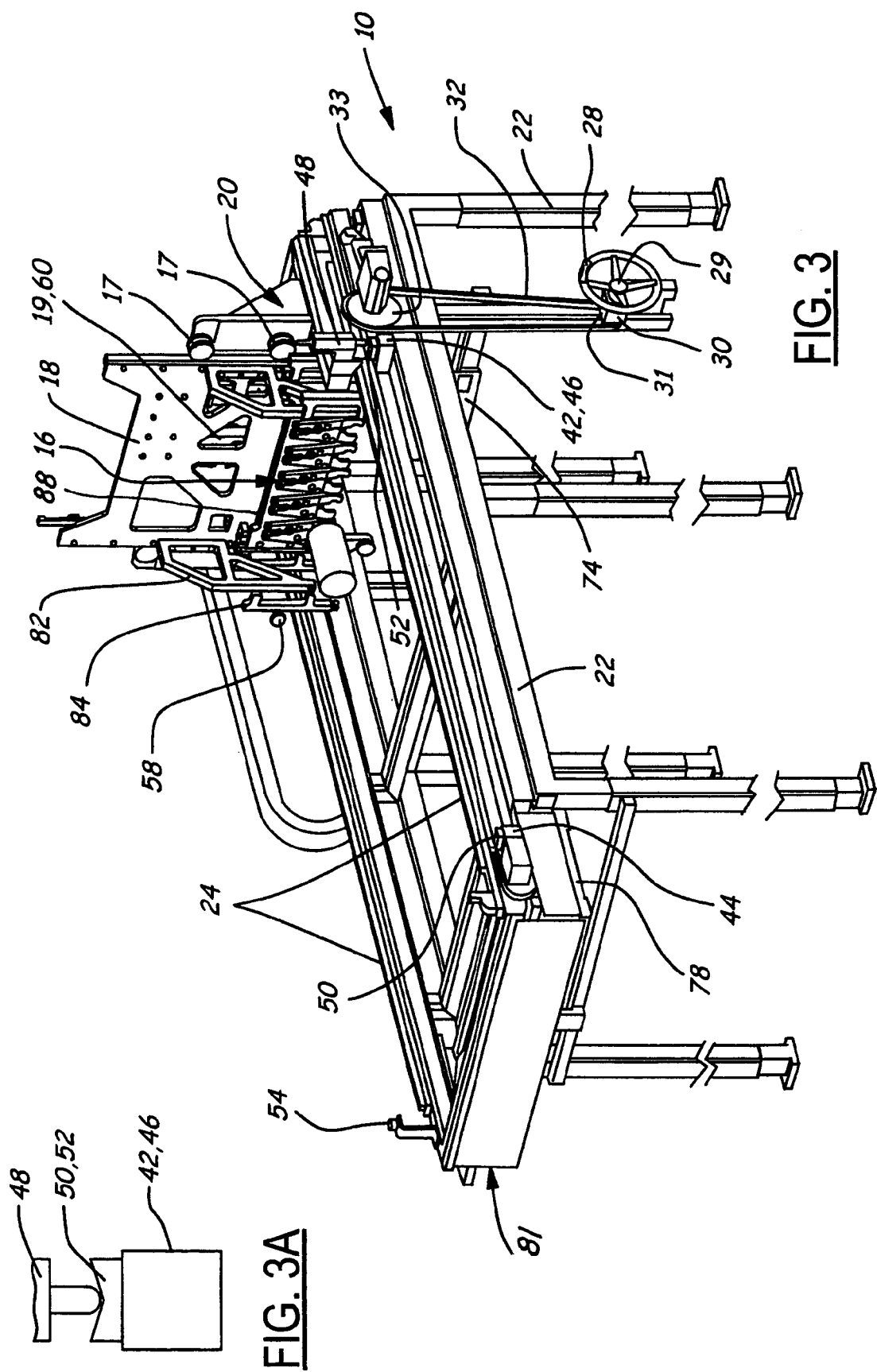
FIG. 3 is a side perspective view of the tool changing apparatus of FIG. 1 with the carriage of the apparatus shown in a rearward position and showing the front of the guillotine in a raised position.
Figure 4:
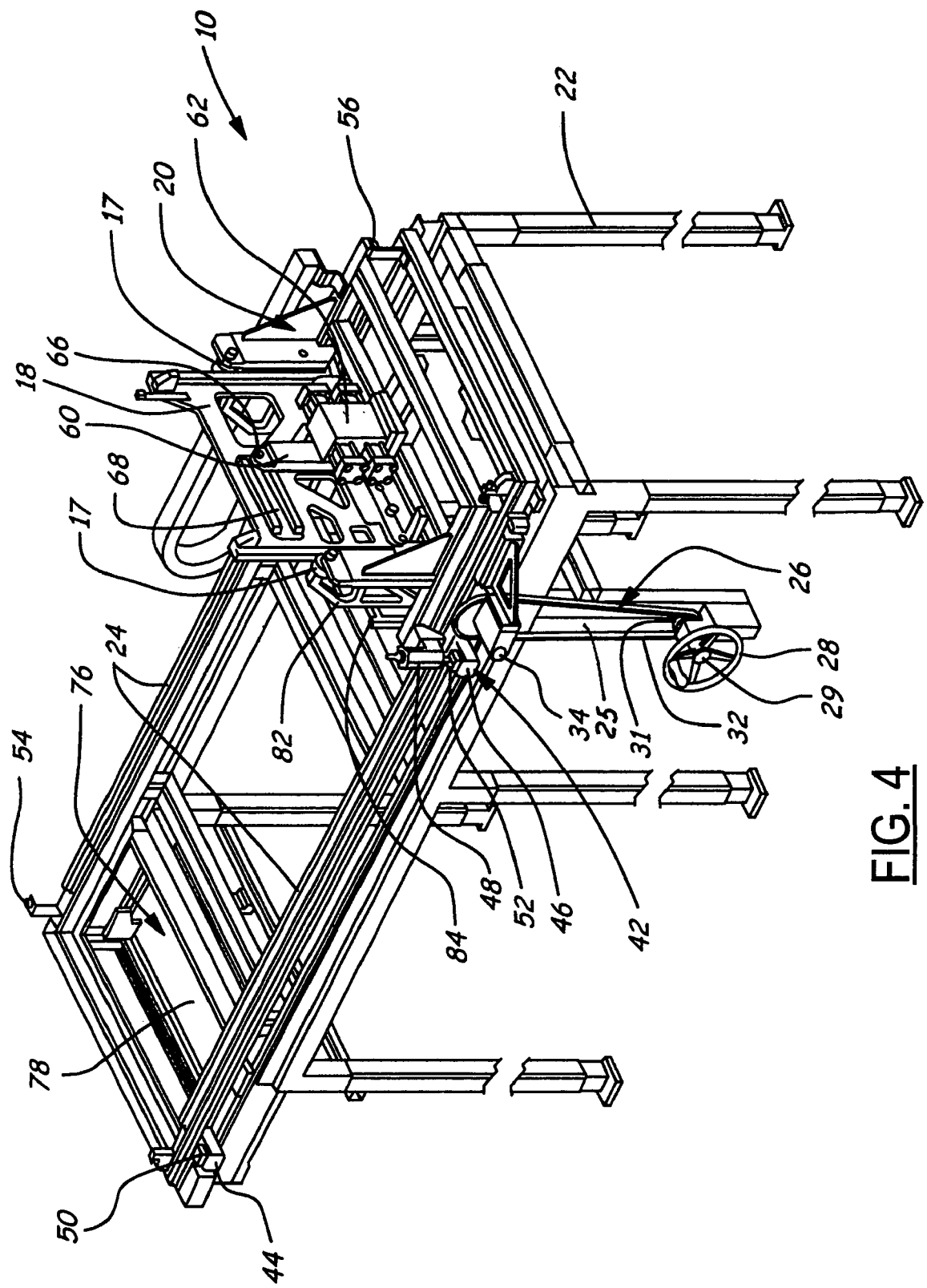
FIG. 4 is a side perspective view of the tool changing apparatus and transfer machine module of FIG. 1 with the carriage of the apparatus shown in a rearward position and showing the back of the guillotine in a raised position.
Figures 5, 6:
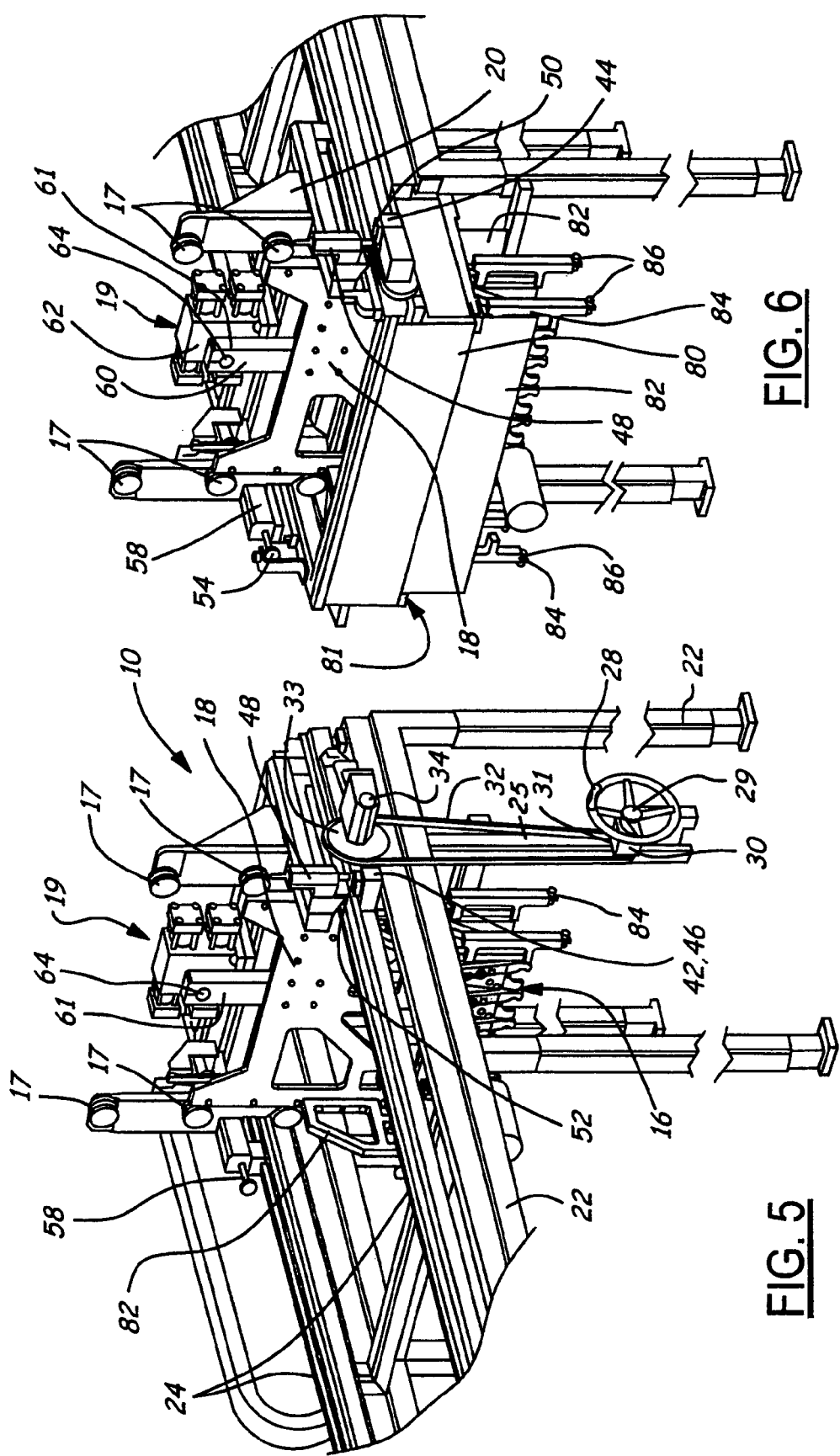
FIG. 5 is a partial side perspective view of the tool changing apparatus and transfer machine module of FIG. 1 showing the carriage in a rearward position and showing the front of the guillotine in a lowered position.
FIG. 6 is a partial side perspective view of the tool changing apparatus and transfer machine module of FIG. 1 showing the carriage in a forward position and showing the front of the guillotine in a lowered position.

The guillotine 18 moves the tool gripper magazine 16 from a rearward raised transit position shown in FIGS. 3 and 4, to a rearward lowered tool replenish position shown in FIG. 5, when the carriage 20 is in its rearward position on the support frame 22. In the rearward, lowered tool replenish position, the tool gripper magazine 16 is within easy reach of an operator standing on the shop floor.

Figure 4A:
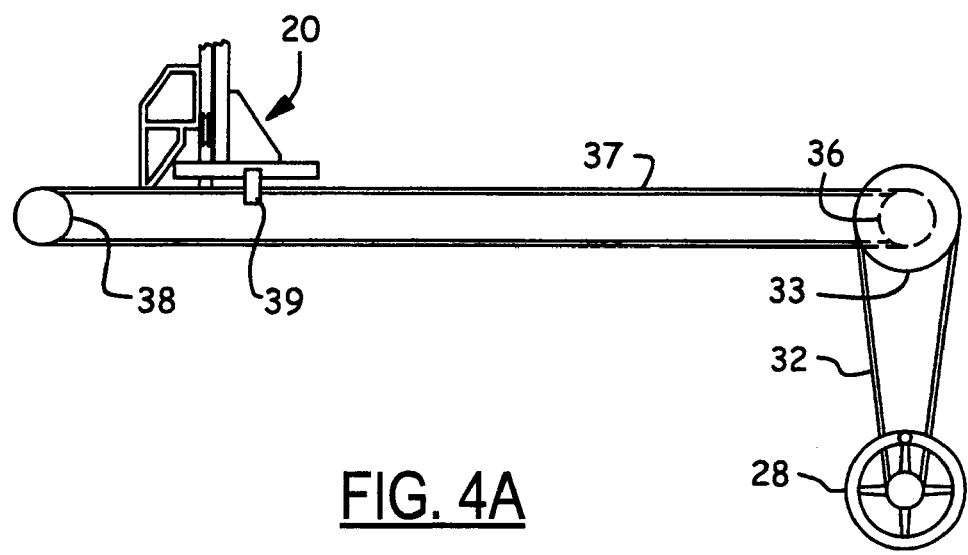
FIG. 4A is a detail view showing a chain drive mechanism for the carriage.

The guillotine drive 19 is operably connected between the guillotine 18 and the carriage 20 and moves the guillotine 18 between the raised and lowered positions. The support frame 22 has a length sufficient to allow the carriage 20 to move the guillotine 18 and tool gripper magazine 16 from a forward position above the transfer machine spindle 13 to a rearward position clear of the transfer machine module 12. The support frame 22 includes two elevated parallel rails 24 that extend from the forward position to the rearward position. The carriage 20 is slidably supported on the two rails 24 for motion between the forward and rearward positions. Carriage motion between the forward and rearward positions is driven by a manually operated mechanical linkage 26 that includes a hand crank 28 mounted on a support beam 25 attached to the support frame 22. The hand crank 28 is fixed to a lower shaft 29 that is supported by a lower bearing block 30. Also mounted to the shaft 29 is a drive sprocket 31 that drives a chain 32. The chain 32 drives a large transfer sprocket 33 that is mounted to an upper shaft 34 supported by an upper bearing block. As shown in FIG. 4A, a small transfer sprocket 36 is also attached to the upper shaft 34 and drives a transfer chain 37. The transfer chain 37 is wrapped around a forward sprocket 38 mounted on the front of the support frame 22 and is attached to the carriage 20 by a chain clamp 39. If desired, the hand crank 28 may be replaced by an electric motor with a manual or automatically actuated switch to turn the motor on and off in order to control the movement of the carriage 20 and the guillotine 18 between the forward and rearward positions.

As shown in FIGS. 2–8, the apparatus 10 includes forward and rearward position locks 44 and 46, respectively, that releasably engage and retain the carriage 20 when the carriage 20 moves into the respective forward and rearward positions. The forward position lock 44 prevents the carriage 20 from moving from the forward position while the guillotine 18 is operating between the raised stand-by and lowered tool change positions. The rearward position lock 46 prevents the carriage 20 from moving out of the rearward position while the guillotine 18 is moving between the raised transit and lower tool replenish positions. As shown in FIG. 3A, a spring loaded plunger 48 supported on the carriage 20 releasably engages a forward V-block 50 when the carriage 20 moves into the forward position and releasably engages a rearward V-block 52 when the carriage 20 moves into the rearward position. The carriage 20 is shown in the forward position in FIGS. 2 and 6–8, and in the rearward position in FIGS. 3–5.

The apparatus 10 also includes forward and rearward proximity sensors 54 and 56, respectively, positioned to signal a machine controller 57 when the carriage 20 is in its respective forward and rearward positions. The controller 57, schematically shown in FIG. 2, prevents the guillotine 18 from moving out of its raised position when the carriage 20 is out of its respective forward and rearward positions. To accomplish this, a sensor dog 58, shown in FIGS. 2, 3, 5 and 6, is attached to the carriage 20 and causes the respective proximity sensors 54, 56 to send signals to the machine controller 57 when the carriage 20 is in its respective forward or rearward positions. If the proximity sensors 54, 56 do not show that the carriage 20 is in either its proper forward or rearward position, the controller 57 will not actuate the guillotine drive 19 to lower the guillotine 18 from the raised position.

The frame 22 supporting the carriage 20 is a rigid box shaped structure. The frame 22 movably supports the carriage 20, guillotine 18 and tool gripper magazine 16 above the transfer machine module 12. When the carriage 20 is in the forward position the guillotine 18 is able to move downward from its stand-by position to its tool change position directly above the transfer machine module spindle 13 as shown in phantom in FIG. 1, and as shown in FIG. 6.

Figure 9:
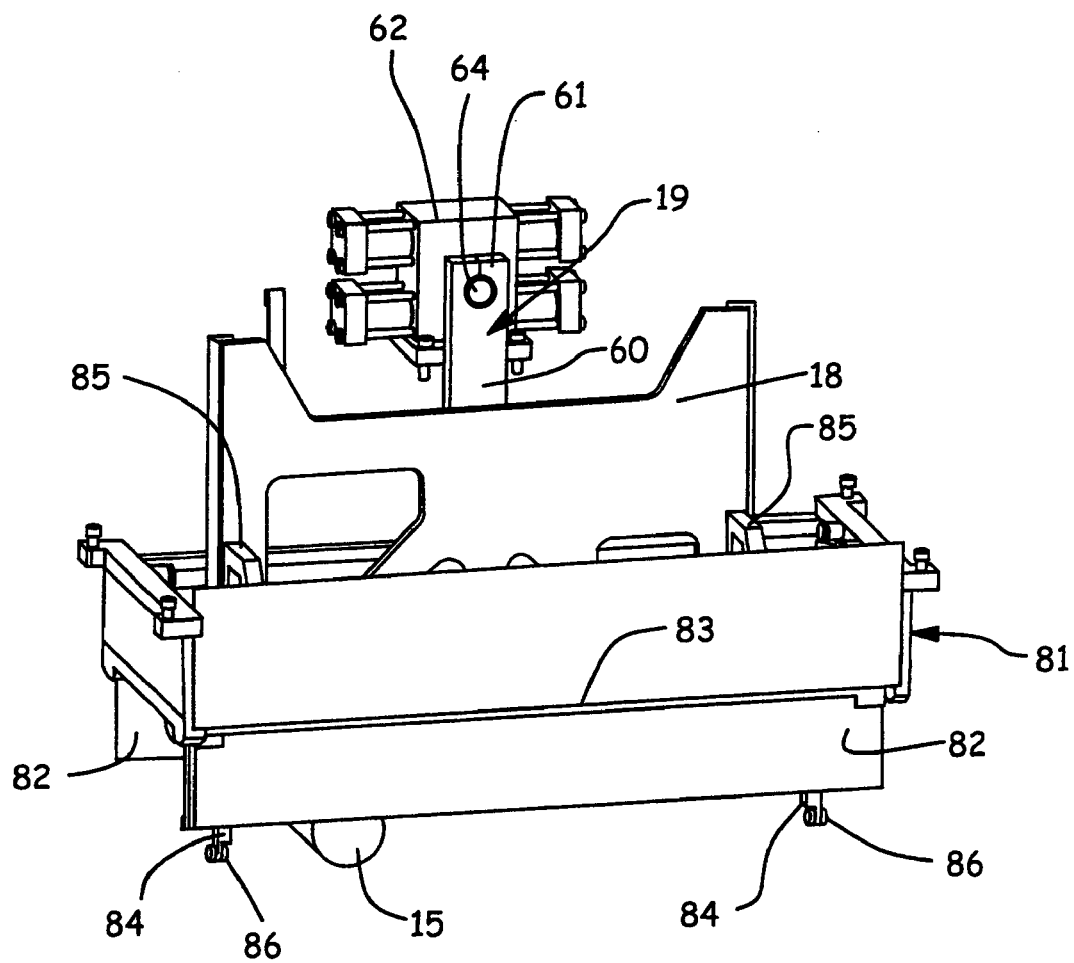
FIG. 9 is a detail view taken from the front showing the guillotine in the lowered position.
Figure 7:
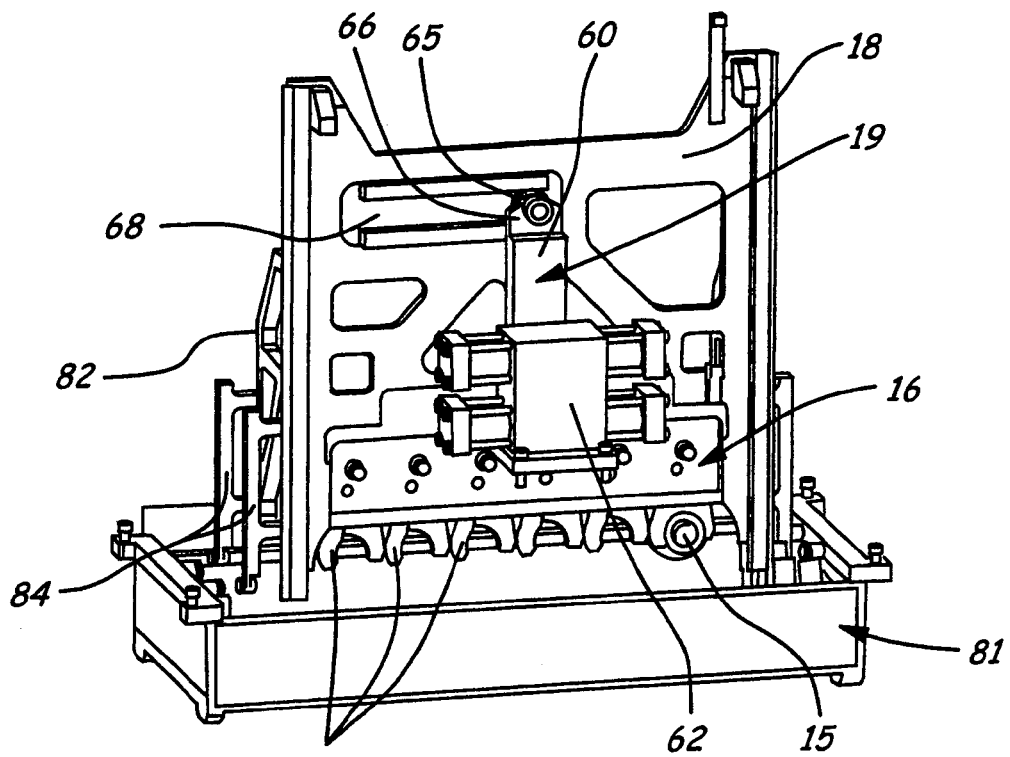
FIG. 7 is a detail view taken from the rear showing the guillotine in the raised position.
Figure 8:
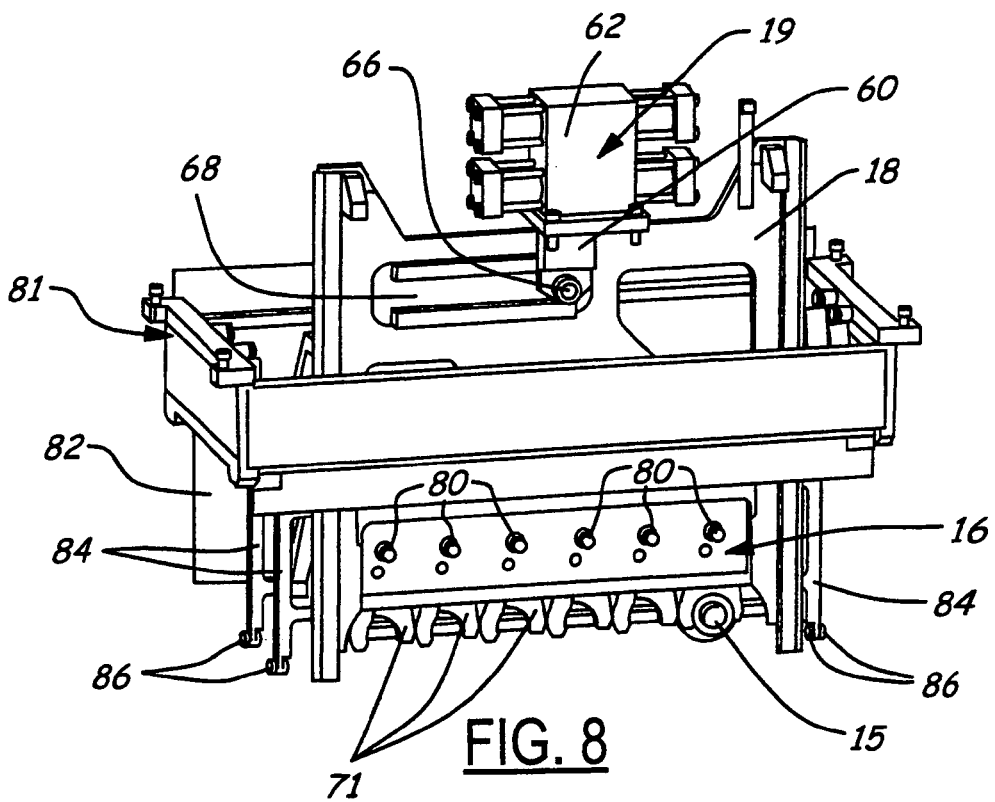
FIG. 8 is a detail view taken from the rear showing the guillotine in the lowered position.

The guillotine drive 19 is operably connected between the guillotine 18 and the carriage 20 and drives the guillotine 18 through a harmonic motion devoid of jerk. As best shown in FIGS. 7–9, the guillotine drive 19 includes a rotary arm 60 having a first end 61 that is mounted on the output shaft 64 of a hydraulic motor 62. The second end 66 of the rotary arm 60 supports a rotatably mounted cam wheel 65. The hydraulic motor 62 is supported on the carriage 20 and drives the rotary arm 60 through an arc of 180 degrees. The cam wheel 65 engages a transverse slot 68 in the guillotine 18 such that rotation of the motor shaft 64 and the attached arm 60 causes circular motion of its second end 66 of the arm 60. The transverse slot 68 converts this rotary motion of the second end 66 of the arm 60 into reciprocal vertical harmonic motion of the guillotine 18.

Figure 10A:
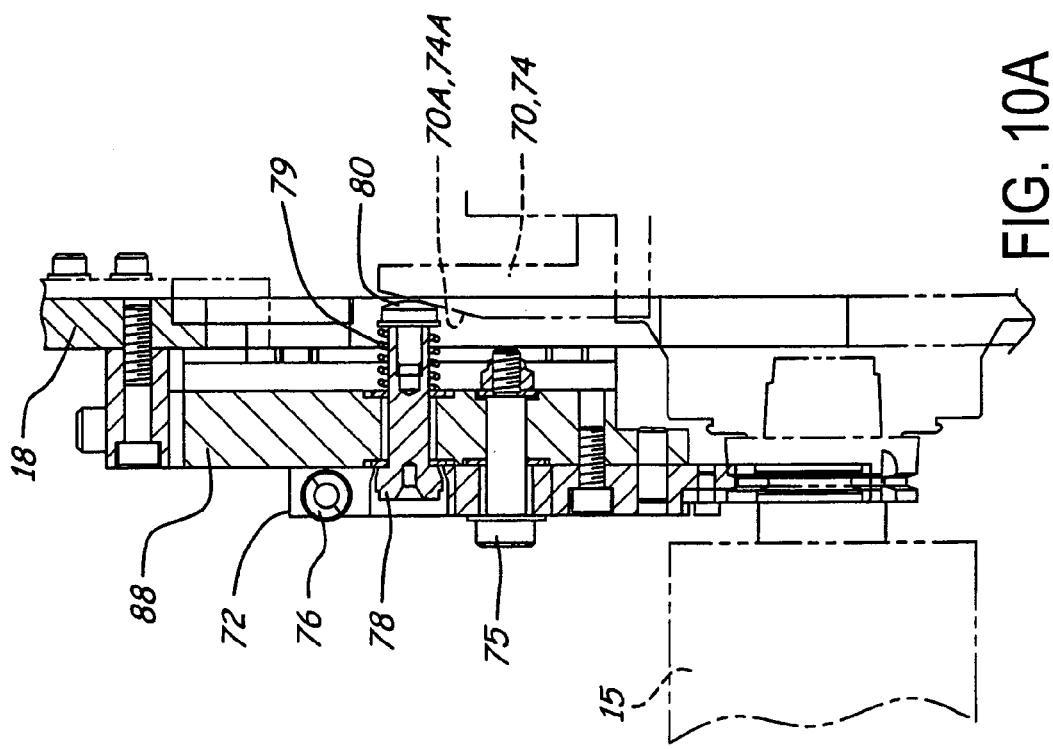
FIGS. 10 and 10A are detail views of a tool gripper in the closed position holding a tool.
Figure 10:
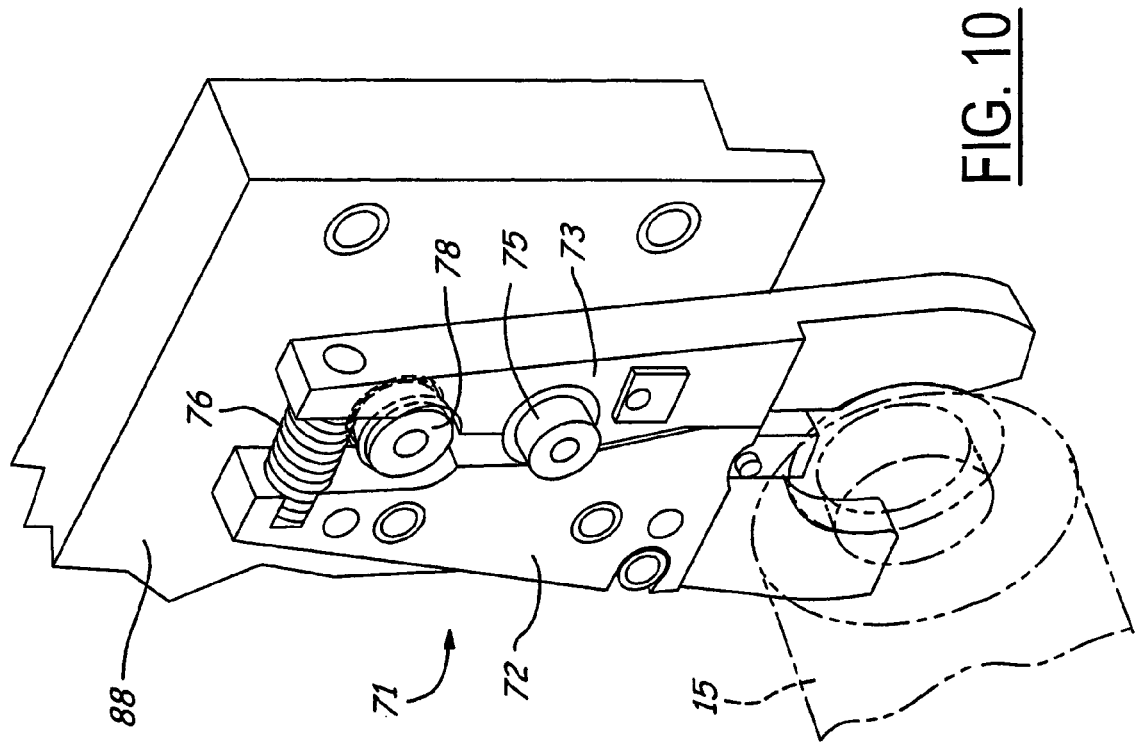
Figure 11A:
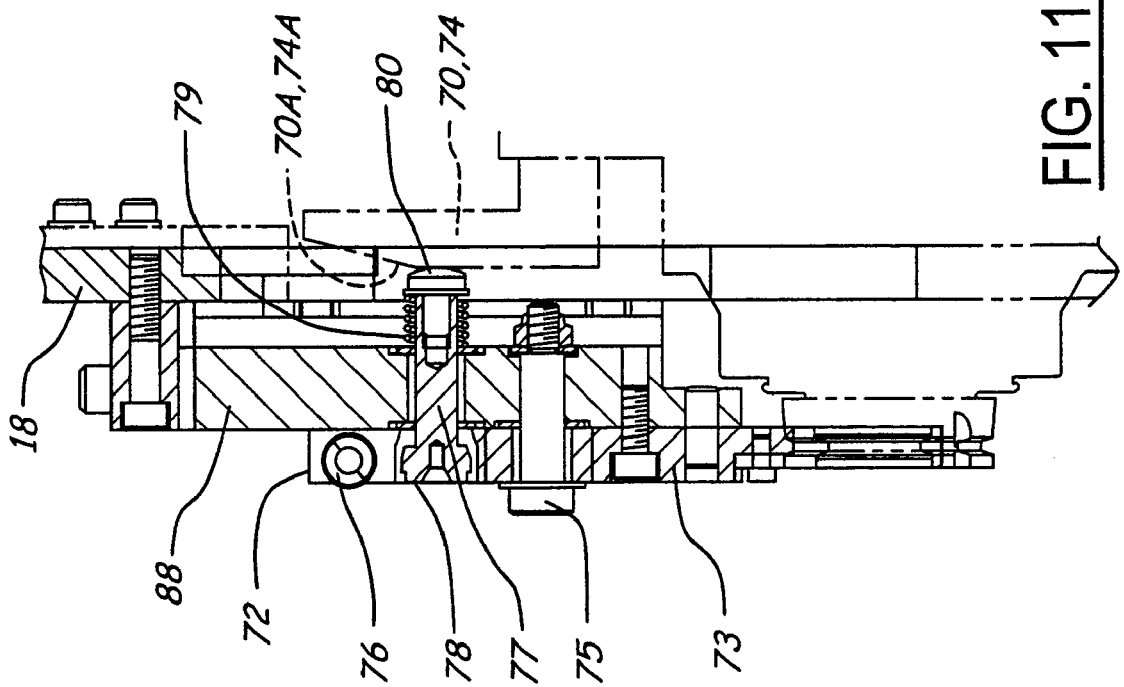
FIGS. 11 and 11A are detail views of the tool gripper of FIGS. 10 and 10A in the open position.
Figure 11:
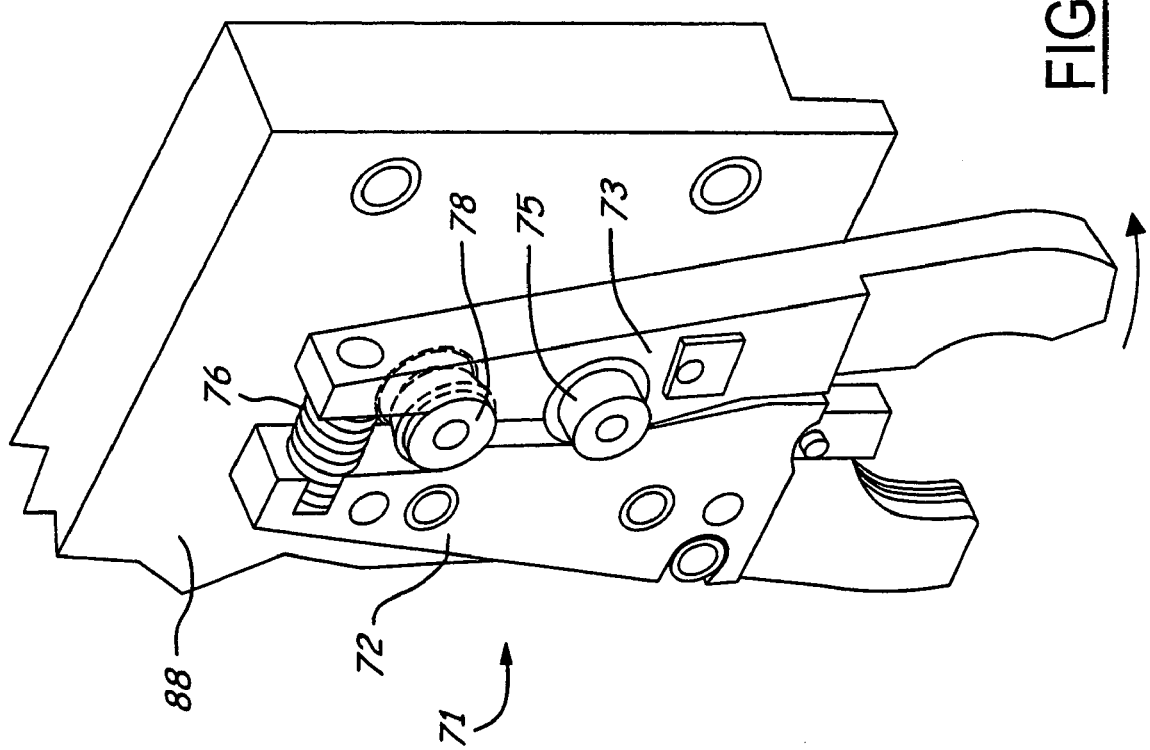

As shown in FIG. 1, a spindle mounted tool gripper release cam plate 70 is supported on the transfer machine module 12 adjacent the spindle 13 in a position to engage and release whichever tool gripper of the magazine 16 the spindle 13 is depositing a tool 15 in, or removing a tool 15 from. In the present embodiment, each tool gripper 71 is a commercially available type tool gripper such as a HSK 63 tool holder. As best shown in FIGS. 10–11, each tool gripper 71 of the tool gripper magazine comprises two jaws 72 and 73 mounted to a gripper support plate 88 that is attached to the guillotine 18. One jaw 72 is rigidly fixed to the plate 88 and the other jaw 73 is attached to the plate 88 by a pivot pin 75. The upper end of the jaws 72 and 73 are biased by a compression spring 76 that closes the lower end of the jaws to grip a tool 15.

In normal operation the motion of the guillotine from the raised to the lowered position may impart sufficient momentum to the tools 15 in the grippers 71 to overcome the gripping force created by the biasing springs 76, allowing one or more of the tools 15 to be dropped by the grippers 71. To prevent this, a locking pin 77 is formed with a head 78 that is positioned between the jaws 72 and 73 to prevent the upper portions of the jaws from coming together and releasing the grip of the lower end of the jaws on a tool 15. The locking pin 77 is biased to the locking position by a spring 79. A cam button 80 on the back of the locking pin 77 can be depressed to move the head 78 out of a locking position between the jaws 72 and 73. A selected one of the cam buttons 80 can be depressed by the spindle mounted tool gripper release cam plate 70 when the spindle 13 is changing individual tools. Upward movement of the spindle 13 drives a ramped surface 70A of the spindle mounted tool gripper release cam plate 70 against the cam button 80 of the particular locking pin 77 to release the tool the spindle will receive, or to open an empty tool gripper 71 so that the gripper can receive a tool. The ramped surface 70A of the tool gripper release cam plate 70 pushes the locking pin 77 axially, allowing the two jaws 72, 73 to move together and release the tool 15. Once unlocked, the spindle 13 can easily insert or remove a tool 15 in the corresponding tool gripper 71.

Figure 2:
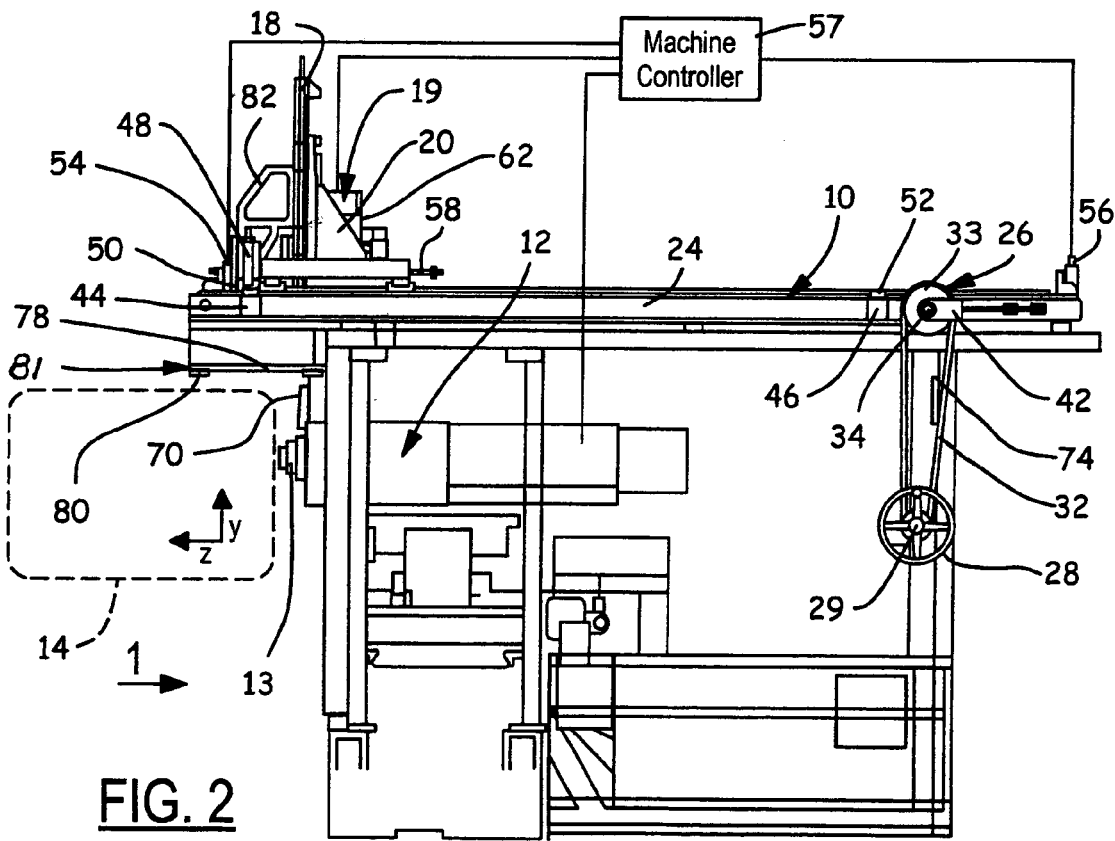
FIG. 2 is a side view of the tool changing apparatus and transfer machine module of FIG. 1 with a carriage of the apparatus shown in a forward position and with a guillotine of the apparatus shown in a raised position.

As shown in FIGS. 2 and 3, the apparatus 10 also includes a frame mounted tool gripper release cam plate 74. The frame mounted tool gripper release cam plate 74 is supported near the rear of the frame 22 in a position to engage and release all six tool grippers 71 in the tool gripper magazine 16 simultaneously when the guillotine 18 moves downward from the upper transit position to the lower replenish position shown in FIG. 5. A cam surface 74A on the frame mounted tool gripper release cam plate 74 that is similar to the cam surface 70A on the spindle mounted tool gripper release cam plate 70 will depress all of the cam buttons 80 on all of the locking pins 77 when the guillotine is in the lower tool replenish position, allowing all of the tools 15 to be removed from their respective tool grippers 71.

FIGS. 3, 6 and 9 show a debris shield 81 supported on the frame 22 to keep the tools 15 free of debris typically released during machining operations. The debris shield 81 is a rectangular box shaped structure having vertical sides and a horizontal floor comprising two rectangular door flaps 82 each of which is supported by a hinge 83. The door flaps 82 are biased by springs to the closed position and automatically close and form a barrier between the spindle 13 and the tool gripper magazine 16 whenever the guillotine is raised. Springs bias the door flaps 82 to their closed position such that when the guillotine 18 is in its raised stand-by position, the door flaps 82 are closed to form a barrier against machining debris. Cam bars 84 with rollers 86 on their terminal ends are attached by brackets 85 to the guillotine 18 and are used to open the door flaps 82. As the guillotine 18 descends, the rollers 86 on the ends of the cam bars 84 bear on the upper surface of the door flaps 82 and force the doors open against the force of the closing springs. To prevent undue wear on the door flaps 82 by the cam bars 84 and the rollers 86, a wear strip may be affixed to the surfaces of the door flaps that are contacted by the rollers 86. As the guillotine 18 is lowered, the rollers 86 contact the wear strips and force each door flap 82 to pivot open about its hinge 83. This clears the door flap 82 away from the guillotine 18, and allows the tool gripper magazine 16 and the tools 15 to be lowered to the tool change position, i.e., the proper height to interface with the spindle 13. As the guillotine 18 is moved upward to its stand-by position after a tool change has taken place, the spring loaded door flaps 82 close automatically behind it.

In practice, spent tools 15 in the tool magazine 16 may be replenished (replaced) by an operator by first turning the crank 28 to manually move the carriage 20 from its forward position to its rearward position shown in FIG. 4. Once the carriage 20 reaches its rearward position, the rearward position lock 46 is engaged to hold the carriage 20 in its rearward position and the rearward proximity sensor 56 is actuated, signaling the controller 57 that the guillotine 18 may be safely operated. The operator then actuates the guillotine drive 19 to move the guillotine 18 from its upper transit position to its lower replenish position shown in FIG. 5. As the guillotine 18 moves to its lower replenish position, the tool magazine 16 contacts the frame mounted tool gripper release plate 74 causing the lock pins 77 in all of the tool grippers 71 in the tool gripper magazine 16 to simultaneously disengage. This allows an operator to easily remove the spent tools 15 by pulling downward on them.

The operator then inserts new or reconditioned tools 15 into the tool grippers 71 and actuates the guillotine drive 19 to raise the guillotine 18 from its lower replenish position to its upper transit position. Once the guillotine 18 has reached its upper transit position shown in FIG. 4, the operator then operates the hand crank 28 to move the carriage 20 from its rearward position back to its forward position shown in FIG. 2. Once the carriage 20 reaches its forward position, the forward position lock 44 engages holding the carriage 20 securely in its forward position and the forward proximity sensor 54 signals the controller 57 that the carriage 20 is in the proper position to allow downward movement of the guillotine 18 for a tool change operation.

As shown in FIGS. 12–15, an alternate embodiment of the tool changing apparatus includes a circular tool gripper magazine 90 instead of the linear magazine 16. The alternate embodiment is identical to the embodiment described above in most other respects. In FIGS. 12–15, structures identified with a primed numeral correspond to structures identified by non-primed numerals appearing in FIGS. 1–11. Unless stated otherwise in the following description, the description of structures identified by non-primed numerals in FIGS. 1–11 applies to structures identified by primed numerals in FIGS. 12–15.

Figure 12:
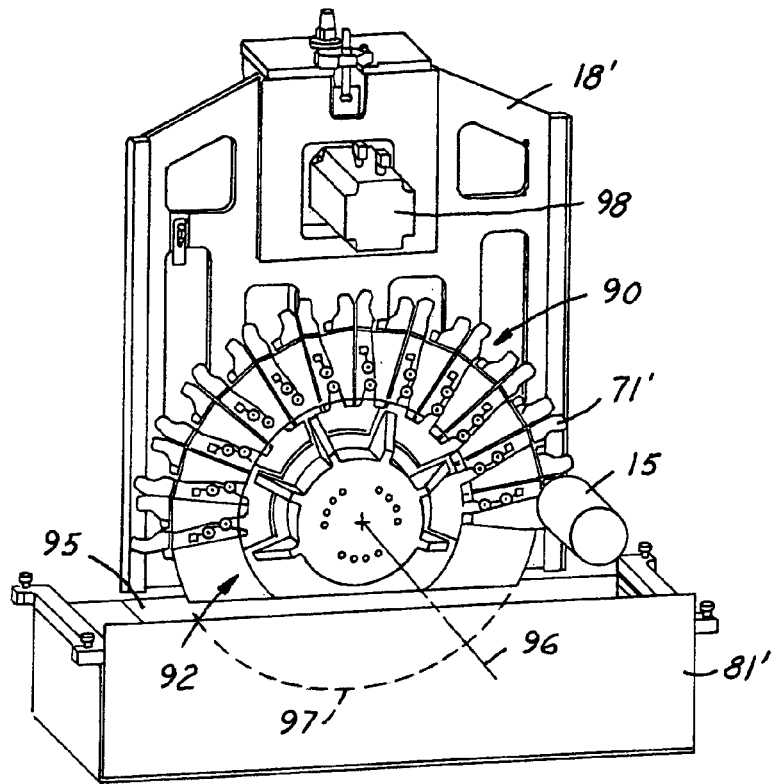
FIG. 12 shows an alternate embodiment of the invention taken from the front in which the tool magazine is circular in shape.
Figure 13:
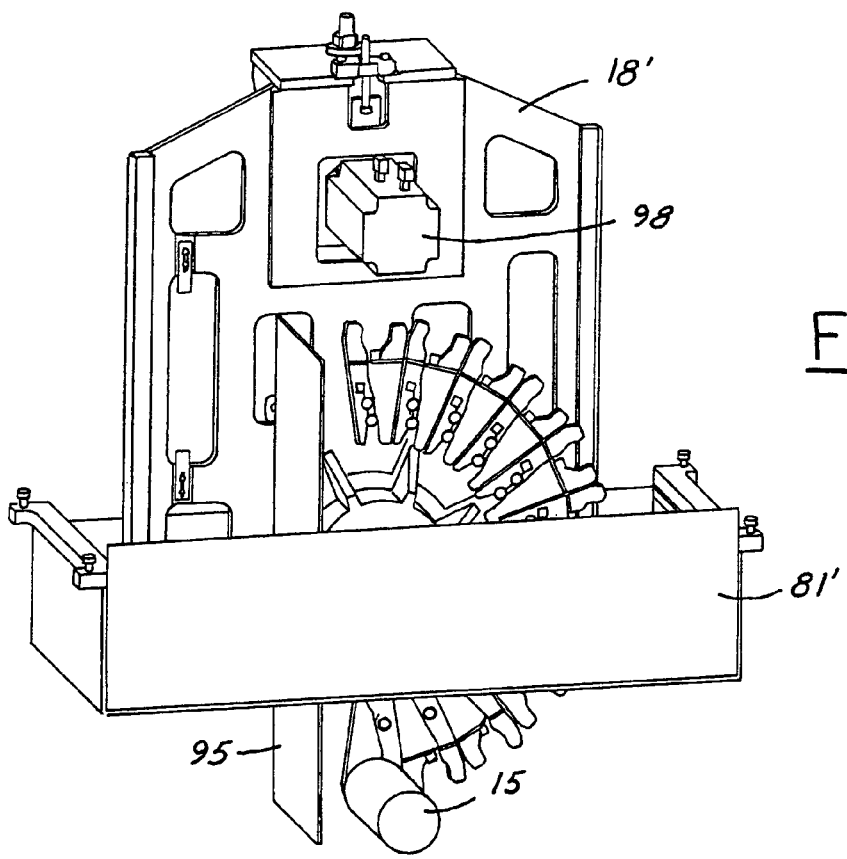
FIG. 13 shows the embodiment of FIG. 10 taken from the front in which the tool magazine is in the lowered position.
Figure 14:
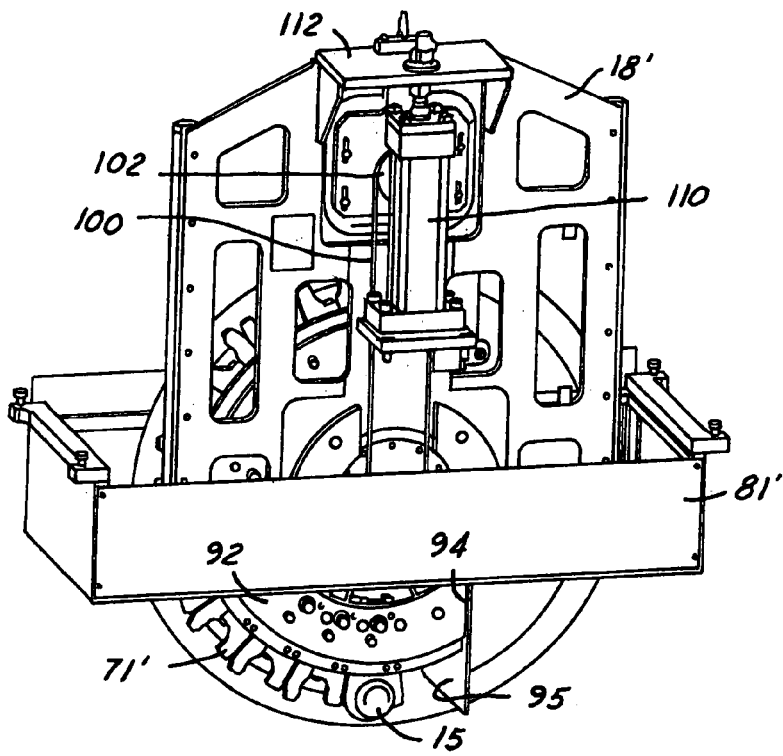
FIG. 14 is a view of the alternate embodiment of FIG. 10 taken from the back in which the tool magazine is in the lowered position.

The rotary tool gripper magazine 90 is rotatably supported on a guillotine 18' and includes twelve tool grippers 71' arranged around an approximately semi-circular tool changer disk 92. Other embodiments may include more or less than twelve tool grippers 71'. The tool changer disk 92 is truncated along a chord line 94 spaced approximately one-half to one-third the radial distance from the rotational axis 96 of the disk 92, and an imaginary extended circumference 97 of the disk 92 as best shown in FIG. 12. The tool gripper magazine 90 is rotatable between a stowed position as shown in FIG. 12, and twelve radially-spaced tool change positions, each of which positions one of the tool grippers 71' in a six o'clock tool exchange location where the spindle 13 can gain access to it. In FIGS. 13 and 14, the tool 15 is shown in the six o'clock tool exchange position.

Figure 15:
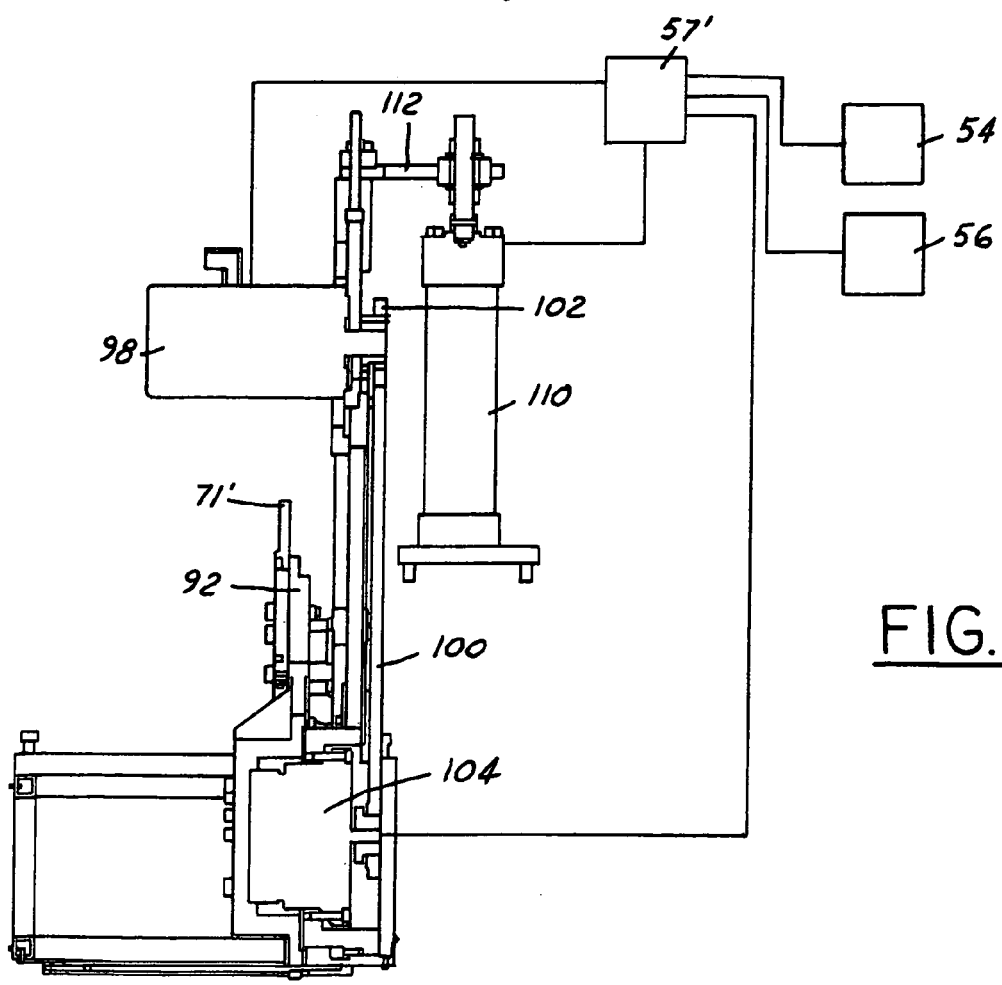
FIG. 15 is a diagrammatic showing the control circuit for the embodiment of FIG. 10.

Unlike the debris shield 81 of the first-described embodiment, the debris shield 81' of the alternative embodiment includes a single door panel 95 fixed to the tool changer disk 92 along the chord line 94 of the disk 92 rather than being hinged to a rectangular box-shaped structure of the debris shield 81. The door panel 95 is supported on the disk 92 in a position to form a floor and close the rectangular box-shaped structure of the debris shield 81' when the disk 92 is rotated to its stowed position as shown in FIG. 12. In the stowed position, all the tool changer tool grippers 71' are positioned above the door flap 95 as shown. The disk 92 is rotated by an electric servo motor 98 supported on the guillotine 18'. The servo motor 98 is operably connected to the rotary tool gripper magazine 90 by a flexible belt drive 100, and rotates the magazine 90 between its stowed position and each of its twelve radially-spaced tool change positions. As shown in FIG. 14, the electric servo motor 98 rotates a pulley 102 that transmits turning force through the drive belt 100 to a reducer 104. The reducer 104 turns the tool changer disk 92. As schematically shown in FIG. 15, the electric servo motor 98 is connected to a controller 57' and receives control signals from the controller 57' that moves the disk 92 through the operational sequence required for a given application. The controller 57' receives signals from the forward proximity sensor 54 and the rearward proximity sensor 56 indicating that the carriage 20 is in the proper position to lower the guillotine 18'. The controller 57' also receives position feedback information from both the disk 92 and the spindle 13 and is programmed to control and coordinate the movements of both the spindle 13 and the disk 92 as described in detail below.

The alternative tool changing apparatus also includes a vertically reciprocating guillotine 18' similar to the guillotine 18 of the first-described embodiment. However, unlike the guillotine 18 of the first-described embodiment, the guillotine 18' of the alternative embodiment is supported to reciprocate only a short vertical distance of approximately eleven inches. This carries the guillotine 18' between an upper stand-by position vertically clear of the transfer machine module 12 being serviced and a lower tool change position close enough to the spindle 13 to allow the spindle 13 access to tools held in the tool changer tool grippers 71' when the tool grippers 71' are rotated downward. A hydraulic lift cylinder 110 is connected at a lower end to the support frame 22 and at a top end to a lift bracket 112 fixed to an upper end of the guillotine 18'. When actuated, the lift cylinder 110 alternately raises and lowers the guillotine 18' and the attached rotary tool gripper magazine 90 between the stand-by and tool change positions.

In practice, spent tools 15 held by the rotary tool gripper magazine 90 may be replenished (replaced) by first actuating the lift cylinder 110 to raise the guillotine 18' and rotary tool gripper magazine 90 to the stand-by position before turning the crank 28 to manually move the carriage 20 from its forward position to its rearward position. This positions the tool gripper magazine 90 high enough to clear the transfer machine module while moving to the rearward position.

Once the carriage 20 reaches its rearward position, the rearward position lock 46 is engaged to hold the carriage 20 in its rearward position and the rearward proximity sensor 56 is actuated signaling the controller 57' that the guillotine 18' and rotary magazine 90 may be safely operated. The operator first actuates the servo motor 98 to rotate the rotary tool gripper magazine 90 approximately 135 degrees, positioning the tool grippers 71' below the rotary axis 96 of the magazine 90. The operator then actuates the lift cylinder 110 to move the guillotine 18' downward through its approximate eleven inches of vertical travel to position the guillotine 18' at the lower replenish position, where an operator can easily reach and replace the tools held in the tool grippers 71'. After the old tools have been removed from the magazine 90 and new tools have been put in their place, the operator actuates the lift cylinder 110 to move the guillotine 18' upward through its approximate eleven inches of travel. The operator then actuates the servo motor 81 to rotate the rotary tool gripper magazine 90 approximately 135 degrees so that the tool grippers 71' are positioned above the rotary axis 96. The operator then operates the hand crank 28 to move the carriage 20 from its rearward transit position back to its forward stand by position. Once the carriage 20 reaches its forward position, the forward position lock 44 engages holding the carriage 20 securely in its forward position and the forward proximity sensor 54 signals the controller 57' that the carriage 20 is in an acceptable position to allow vertical movement of the guillotine 18'. The controller 57' then actuates the lift cylinder 110 to lower the guillotine 18' and magazine 90 downward to the tool change position.

After the magazine 90 is lowered, the controller 57' first actuates the rotary magazine 90 to rotate a predetermined number of degrees to position a first tool at the six o'clock position of the magazine 90. The controller 57' then directs the spindle 13 to retrieve that tool from the magazine as described above with respect to the first-described embodiment. Once the spindle 13 has retrieved the tool in the six o'clock position, the magazine 90 rotates until the door panel 95 is in the horizontal position. This positions all of the tool changer tool grippers 71' within the debris shield and above the door panel 95. The controller 57' then directs the spindle 13 to use the first tool to perform certain machining operations on a workpiece passing through the work zone tunnel 14. The controller 57' commands the magazine 90 to rotate until the empty tool gripper 71' is at the lowest position. The controller 57' then directs the spindle 13 to deposit the first tool in the empty tool gripper 71', and then to retract the spindle until the first tool is withdrawn from the spindle. The controller 57' then commands the magazine 90 to rotate to position a second tool at the six o'clock position. The controller 57' then directs the spindle 13 to retrieve this tool from the magazine 90, and the cycle is repeated until all the tools have been used to perform the required machining operations on the workpiece. Once all the operations have been completed on the workpiece, the controller 57' starts the cycle again with the first tool for the next workpiece to move down the work zone tunnel 14. This continues until the end of the shift or until such time that the tools in the magazine 90 need to be replaced. At this time, the replenishment operation described above is repeated.

Figure 16:
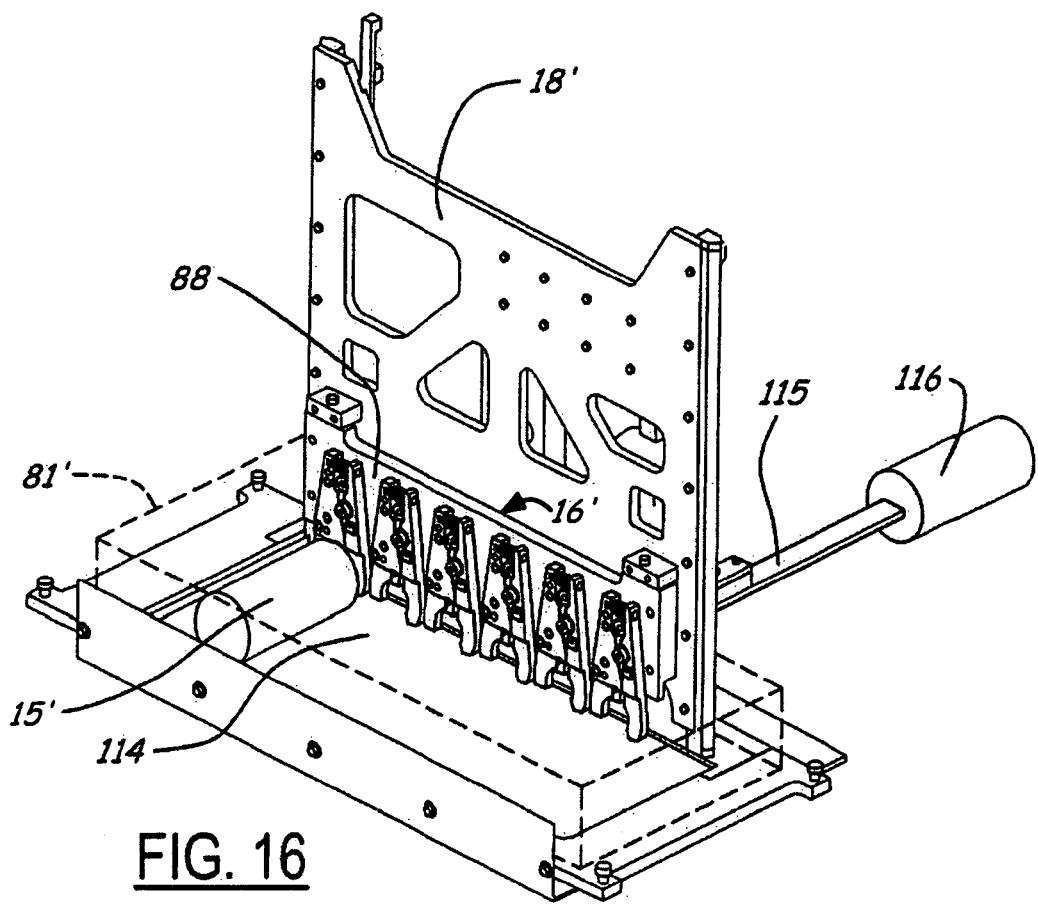
FIG. 16 shows an alternate embodiment of the invention taken from the front in which the door that separates the tool magazine from the work zone tunnel slides horizontally between open and closed positions.
Figure 17:
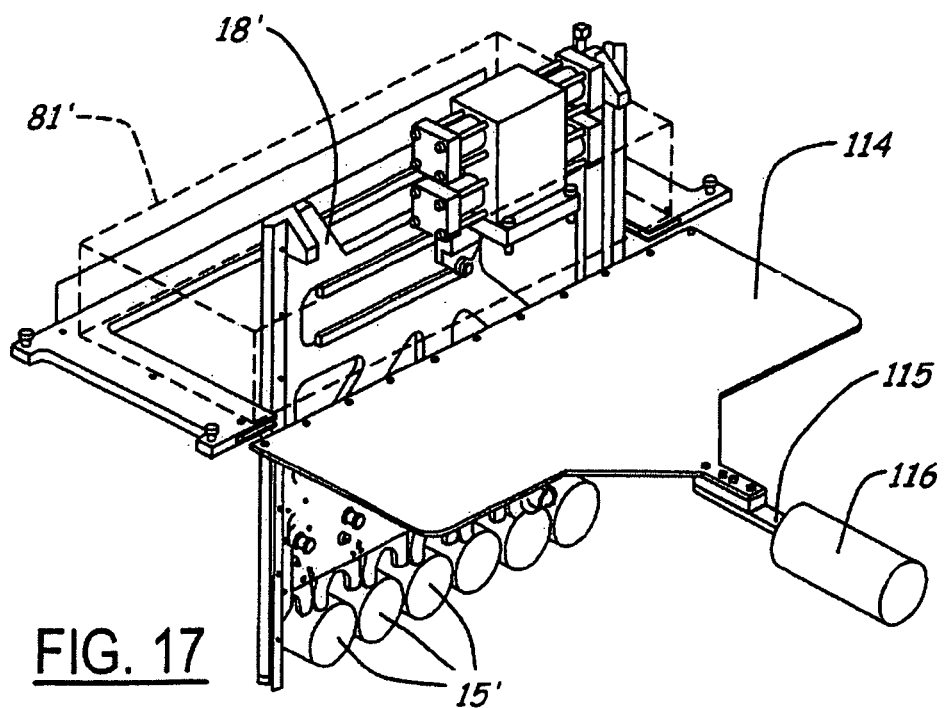
FIG. 17 shows the embodiment of FIG. 16 with the sliding door in the open position.

FIGS. 16 and 17 show an alternate embodiment of the invention in which the door that closes the bottom of the debris shield is mounted to slide horizontally. As shown in the drawing figures, a door 114 forms the bottom of a debris shield 81' shown in phantom. The door 114 is attached to the actuating rod 115 of a pneumatic cylinder 116 and moves on horizontal guides or rails (not shown) between a closed position as shown in FIG. 16 and an open position as shown in FIG. 17. In the closed position, the door 114 shields the tool gripper magazine 16' and the tools 15' from the machining debris generated by the spindle below. In the open position, the door opens the space below the tool gripper magazine 16' allowing the guillotine 18' to lower the tool gripper magazine and the tools to the tool change position adjacent to the spindle (not shown).

This description is intended to illustrate certain embodiments of the invention rather than to the limit the invention. Therefore, it uses descriptive rather than limiting words. Obviously, it's possible to modify this invention from what the description teaches. Within the scope of the claims, one may practice the invention other than as described.

We claim:

1. A tool changing apparatus for cooperating with a transfer machine module on a transfer line to automatically change tools mounted on a machine tool spindle of the transfer machine module, the machine tool spindle having a horizontal X-axis, a vertical Y-axis, and a horizontal Z-axis, the Z-axis defining the direction of spindle feed-out, the apparatus comprising:

a linear tool gripper magazine positioned above the forward end of the transfer machine module and configured to releasably hold at least two tools;

a guillotine supporting the tool gripper magazine for vertical motion parallel to the Y-axis between a raised stand-by position above the machine tool spindle and the transfer machine module and a lowered tool change position closer to the spindle where at least one of the tools at a time can be exchanged with a tool supported on the spindle;

a guillotine drive operably connected to the guillotine and configured to move the guillotine vertically, perpendicular to the Z-axis, between the raised stand-by and the lowered tool change positions;

a support frame supporting the tool gripper magazine, the guillotine, and the guillotine drive above the transfer machine module; and a carriage movably supporting the tool gripper magazine on the support frame for horizontal motion parallel to the Z-axis along a path that is above the transfer machine module between a forward position above the transfer machine module, and adjacent the transfer line and spindle, and a rearward position above the transfer machine module and displaced from the transfer line and clear of the transfer machine module, the tool gripper magazine being movable between the raised stand-by and the lowered tool change positions when the carriage is in the forward position.

2. A tool changing apparatus as defined in claim 1 in which the guillotine is configured to move the tool gripper magazine vertically, perpendicular to the Z-axis from a raised transit position above the transfer machine module to a lower replenish position more easily accessible to an operator when the carriage is in its rearward position.

3. A tool changing apparatus as defined in claim 2 in which the guillotine drive is configured to move the guillotine between the raised transit positions and the lowered replenish position.

4. A tool changing apparatus as defined in claim 1 in which:

the support frame includes at least one rail positioned above the transfer machine module and extending from the forward position to the rearward position; and the carriage is movably supported on the at least one rail for motion between the forward and rearward positions.

5. A tool changing apparatus as defined in claim 1 in which carriage motion between the forward and rearward positions is driven by a manually operated mechanical linkage.

6. A tool changing apparatus as defined in claim 1 in which the apparatus includes a forward position lock that releasably engages and retains the carriage in the forward position when the carriage moves into the forward position.

7. A tool changing apparatus as defined in claim 1 in which the apparatus includes a rearward position lock that releasably engages and retains the carriage in the rearward position when the carriage moves into the rearward position.

8. A tool changing apparatus as defined in claim 2 in which:

the apparatus includes forward and rearward proximity sensors positioned to signal a machine controller when the carriage is in its respective forward and rearward positions; and the controller prevents the guillotine from moving out of the raised stand-by and transit positions when the carriage is out of its respective forward and rearward positions.

9. A tool changing apparatus as defined in claim 1 in which the guillotine drive is operably connected between the guillotine and the carriage and is configured to drive the guillotine through a harmonic motion.

10. A tool changing apparatus as defined in claim 9 in which the guillotine drive includes motor-driven rotary arm that has a first end rotatably supported on the carriage and a second end slidably engaging a transverse slot in the guillotine such that rotation of the arm about the one end causes circular motion of the second end which the transverse slot converts into reciprocal vertical harmonic motion of the guillotine.

11. A tool changing apparatus as defined in claim 1 in which the apparatus includes a spindle mounted tool gripper release plate configured to be supported on the machine tool spindle in a position to engage and release whichever tool gripper the spindle is depositing a tool in or removing a tool from.

12. A tool changing apparatus as defined in claim 2 in which the apparatus includes a frame mounted tool gripper release plate configured to be supported in a position to engage and release all tool grippers in the tool gripper magazine simultaneously when the guillotine moves downward from the upper transit position to the lower replenish position carrying the tool gripper magazine into engagement with the frame mounted tool gripper release plate.

13. The tool changing apparatus of claim 1 further comprising:
   a debris shield surrounding the sides and bottom of the tool gripper magazine when the tool gripper magazine is in the raised, stand-by position.

14. The tool changing apparatus of claim 13 further comprising:
   a movable door comprising the bottom of the debris shield, the movable door being hinged to swing open in order to allow the tool gripper magazine to move from the raised stand-by position to the lowered tool change position.

15. The tool changing apparatus of claim 13 further comprising:
   a sliding door comprising the bottom of the debris shield.

16. A tool changing apparatus for cooperating with a transfer machine module on a transfer line to automatically change tools mounted on a machine tool spindle of such a transfer machine module, the machine tool spindle having a horizontal Z-axis, the apparatus comprising:
   a rotary tool gripper magazine including at least two circumferentially arrayed tool grippers, each tool gripper configured to releasably hold a tool;
   a guillotine supporting the rotary tool gripper magazine for vertical motion between a raised stand-by position above the transfer machine module and clear of the machine tool spindle of the transfer machine module and a lowered tool change position closer to the spindle where one tool at a time can be exchanged with a tool supported on the spindle;
   a rotary drive operably connected to the rotary tool gripper magazine, whereby the rotary drive rotates the tool gripper magazine around a horizontal axis to a selected one of a plurality of radially-spaced tool change positions; and
   a carriage movably supporting the guillotine on a support frame for motion along a horizontal axis across the top of the transfer machine module between a forward position adjacent the transfer line and spindle and a rearward position displaced from the transfer line and more easily accessibly to an operator, the rotary tool gripper magazine being rotatable only when the carriage is in its forward or rearward position.

17. The tool changing apparatus of claim 16 further comprising:
   a debris shield surrounding the sides and bottom of the lower portion of the rotary tool gripper magazine when the tool gripper magazine is in the raised, stand-by position; and
   a door panel attached to the tool gripper magazine and held in a horizontal position, the door panel comprising the bottom of the debris shield.

18. The tool changing apparatus of claim 17 wherein rotation of the tool gripper magazine rotates the door panel out of the horizontal position.

* * * * *